US012665339B2

(12) United States Patent
Long

(10) Patent No.: US 12,665,339 B2
(45) Date of Patent: Jun. 23, 2026

(54) TYPE-C FEMALE ELECTRICAL CONNECTOR

(71) Applicant: SHENZHEN PROMAX PRECISE SUBASSEMBLY CO., LTD, Shenzhen (CN)

(72) Inventor: Jien Long, Shenzhen (CN)

(73) Assignee: SHENZHEN PROMAX PRECISE SUBASSEMBLY CO., LTD, Shenzhen (CN)

( * ) Notice: Subject to any disclaimer, the term of this patent is extended or adjusted under 35 U.S.C. 154(b) by 299 days.

(21) Appl. No.: 18/512,423

(22) Filed: Nov. 17, 2023

(65) Prior Publication Data

US 2024/0120676 A1 Apr. 11, 2024

Related U.S. Application Data

(63) Continuation of application No. PCT/CN2022/093912, filed on May 19, 2022.

(30) Foreign Application Priority Data

May 20, 2021 (CN) ......................... 202121097319.2

(51) Int. Cl.
*H01R 13/405* (2006.01)

(52) U.S. Cl.
CPC .................................. *H01R 13/405* (2013.01)

(58) Field of Classification Search
CPC .............. H01R 13/405; H01R 13/6597; H01R 2107/00; H01R 24/60; H01R 13/40; H01R 13/02; H01R 13/652; H01R 13/655
See application file for complete search history.

(56) References Cited

U.S. PATENT DOCUMENTS

| | | | | |
|---|---|---|---|---|
| 9,401,568 | B1 * | 7/2016 | Masuda | H01R 13/6581 |
| 2017/0149165 | A1 * | 5/2017 | Tsai | H01R 13/52 |
| 2021/0399500 | A1 * | 12/2021 | Chang | H01R 24/60 |

FOREIGN PATENT DOCUMENTS

| | | | |
|---|---|---|---|
| CN | 105206962 | A | 12/2015 |
| CN | 105206963 | A | 12/2015 |
| CN | 107611646 | A | 1/2018 |
| CN | 207124316 | U | 3/2018 |
| CN | 112290259 | A | 1/2021 |
| CN | 112670738 | A | 4/2021 |
| CN | 112787129 | A | 5/2021 |

(Continued)

OTHER PUBLICATIONS

International search report of PCT Patent Application No. PCT/CN2022/093912 issued on Aug. 1, 2022.

*Primary Examiner* — Edwin A. Leon

(57) ABSTRACT

Provided is a type-C female electrical connector, including an insulating body and a number of terminals embedded in the insulating body; wherein each of the terminals includes a connecting portion, a fixing portion and a welding leg; the connecting portions of some of the terminals extend from the corresponding fixing portions and are located in a same reference plane as the fixing portions. The connecting portions of some terminals extend from the corresponding fixing portions and are located in the same reference plane as the fixing portions, which facilitates the integral forming of the terminals and reduces the production difficulty of the product.

12 Claims, 8 Drawing Sheets

(56) References Cited

FOREIGN PATENT DOCUMENTS

| | | |
|---|---|---|
| CN | 214313609 U | 9/2021 |
| CN | 215579150 U | 1/2022 |
| CN | 216145785 U | 3/2022 |

* cited by examiner

TYPE-C FEMALE ELECTRICAL CONNECTOR

CROSS REFERENCE TO RELATED APPLICATIONS

The present application is a Continuation Application of PCT Application No. PCT/CN2022/093912 filed on May 19, 2022, which claims the priority of Chinese Utility Model Application No. CN202121097319.2, named "A Type-C Female Electrical Connector" filed on May 20, 2021, the entire contents of which are hereby incorporated by reference.

TECHNICAL FIELD

The present disclosure relates to electronic devices, and more particularly, to an electrical connector.

BACKGROUND

Type-C electrical connectors are widely used in various types of electronic products such as mobile power supplies, Bluetooth earphones, and mobile phones for charging the electronic products or transmitting signals.

The inventor realized that the existing electrical connector has a complex structure and many components; for example, an electronic connector may include many terminals used to transmit electric energy or electrical signals, which are formed by multi-layer terminals and a medium steel sheet. Due to the lack of good positioning reference, the terminal is difficult to be processed, the structural stability of the terminal is poor, and the processing cost of the product containing the terminal is high. However, the existing one-layer terminal product does not have an independent medium steel sheet, which is easy to wear and unstable in performance.

SUMMARY OF THE DISCLOSURE

The present disclosure aims to provide a type-C female electrical connector to solve the technical problem stated above.

In order to solve the above technical problems, the type-C female electrical connector of the present disclosure includes an insulating body and a number of terminals embedded in the insulating body. Each of the terminals includes a connecting portion, a fixing portion and a welding leg; the connecting portions of some of the terminals extend from the corresponding fixing portions and are located in the same reference plane as the fixing portions.

In the present disclosure, the connecting portions of some terminals extend from the corresponding fixing portions, and the connecting portions and the fixing portions are in the same plane which is the reference plane, thus, the connecting portions of the terminals can be integrally formed without bending the connecting portions relative to the corresponding fixing portions or without tearing the connecting portions. Furthermore, the terminals can be positioned more accurately, which reduces the production difficulty and improves the production efficiency. Meanwhile, compared with the process of tearing the base plate part to form the connecting portion, the connecting portion of the terminal of the present disclosure may not be turned over easily, and thus the production quality is more controllable.

PREFERRED EMBODIMENTS

Figure 1:
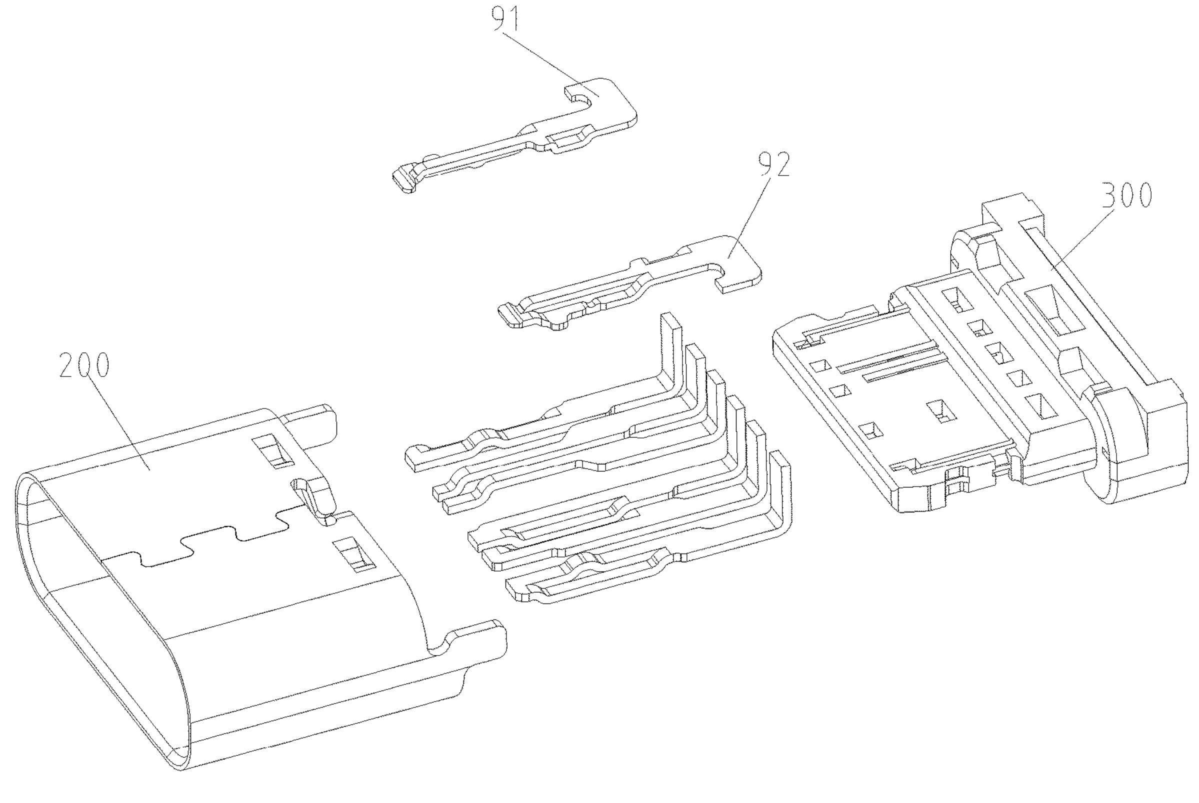
FIG. 1 is an exploded diagram of a type-C female electrical connector in accordance with Embodiment 1 of the present disclosure.
Figure 2:
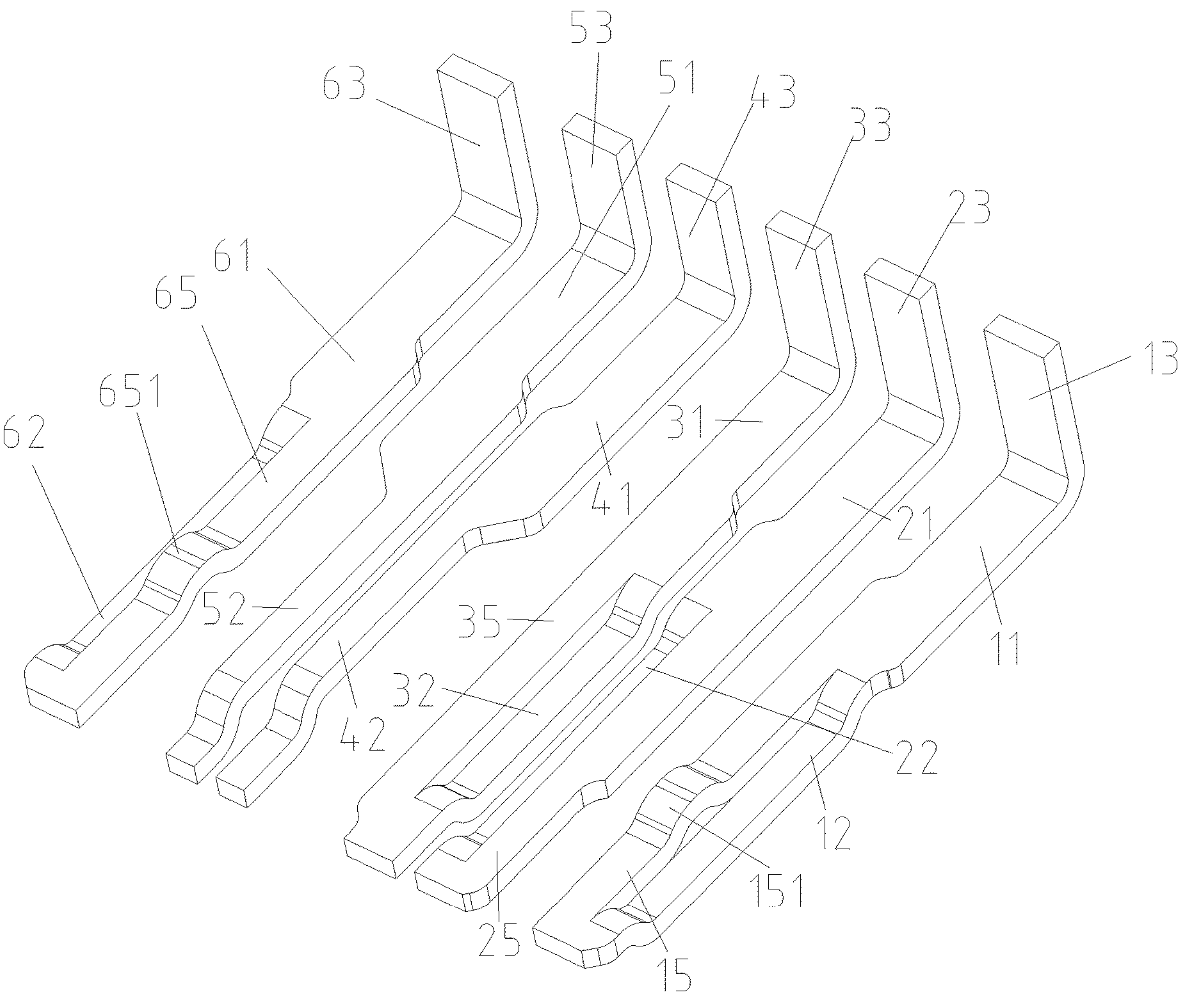
FIG. 2 is a schematic diagram of each terminal of the type-C female electrical connector in FIG. 1.
Figure 3:
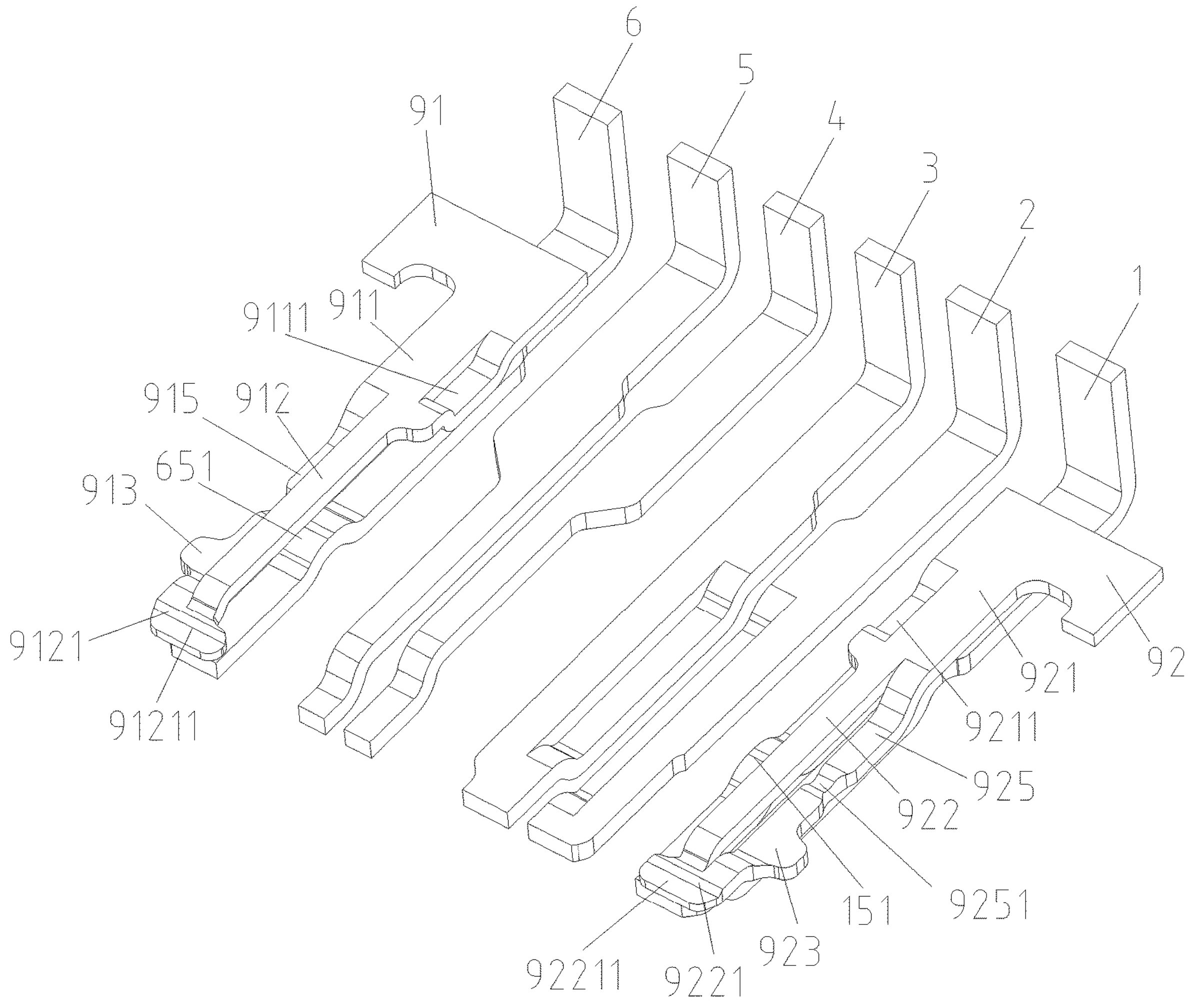
FIG. 3 is a schematic diagram of a lock and each terminal in accordance with an embodiment of the present disclosure.
Figure 4:
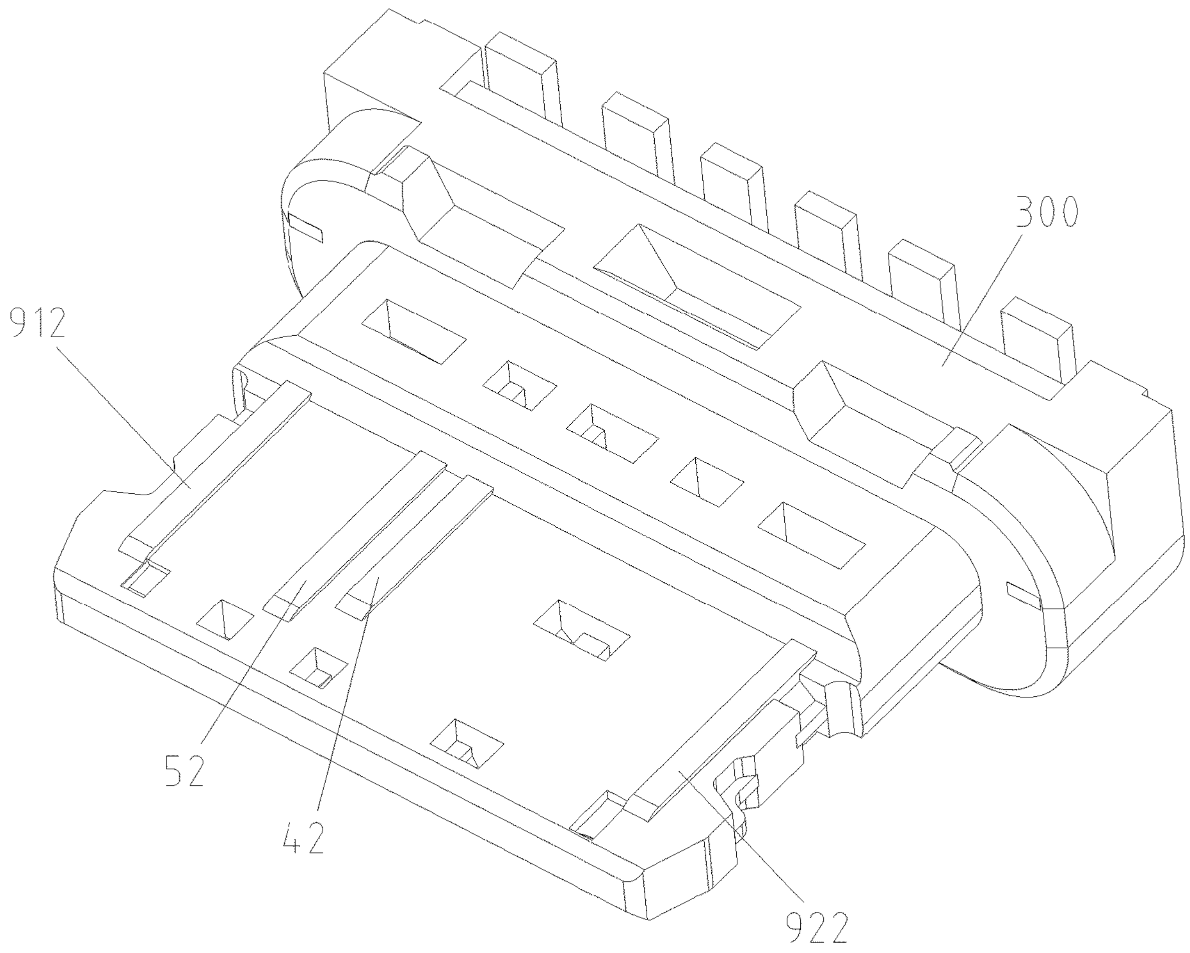
FIG. 4 is a schematic diagram of an insulating body viewed from one angle.

In the following, the technical solutions in the embodiments of the present disclosure will be clearly and completely described with reference to the drawings in the embodiments of the present disclosure.

Embodiment 1

As shown in FIGS. 1-7, a type-C female electrical connector provided in an embodiment of the present disclosure includes an insulating body 300, a metal shell 200 and several terminals embedded in the insulating body 300. In this embodiment, the terminals include a ground terminal 1, a ground terminal 6, a positive power terminal 2, a positive power terminal 5, a signal terminal 3, and a signal terminal 4. Each of the terminals includes a connecting portion, a fixing portion and a welding leg. It is noted that each terminal is integrally formed, wherein the connecting portion of each terminal is connected with one end of the fixing portion, the welding leg is connected with the other end of the fixing portion, and the fixing portion is embedded in the insulating body 300. In an embodiment, the ground terminal 1 includes a connecting portion 12, a fixing portion 11 and a welding leg 13; the ground terminal 6 includes a connecting portion 62, a fixing portion 61 and a welding leg 63; the positive power terminal 2 includes a connecting portion 22, a fixing portion 21 and a welding leg 23; the positive power terminal 5 includes a connecting portion 52, a fixing portion 51 and a welding leg 53; the signal terminal 3 includes a connecting portion 32, a fixing portion 31 and a welding leg 33; and the signal terminal 4 includes a connecting portion 42, a fixing portion 41 and a welding leg 43. Wherein, the connecting portions of some terminals extend from the corresponding fixing portions and are located in the same reference plane as the fixing portions. In an embodiment, the connecting portion 42 of the signal terminal 4 extends from the fixing portion 41 of the signal terminal 4 and is located in the same reference plane as the fixing portion 41, and the connecting portion 52 of the positive power terminal 5 extends from the fixing portion 51 of the positive power terminal 5 and is located in the same reference plane as the fixing portion 51. The fixing portion 11 of the ground terminal 1, the fixing portion 61 of the ground terminal 6, the fixing portion 21 of the positive power terminal 2, and the fixing portion 31 of the signal terminal 3 are located in another reference plane. Some of the terminals respectively include a base plate part in parallel with the corresponding connecting portion, that is, the connecting portion and the base plate part of the terminal are arranged side by side and are connected with the corresponding fixing portion. In an embodiment, the ground terminal 1 includes a base plate part 15, the ground terminal 6 includes a base plate part 65, the positive power terminal 2 includes a base plate part 25, and the signal terminal 3 includes a base plate part 35. The type-C female electrical connector further includes independent locks, including a lock 91 and a lock 92. In this embodiment, for the terminal formed with the base plate part, the connecting portion is formed by tearing the corresponding fixing portion. The fixing portions of the terminals are not all in the same reference plane, wherein the fixing portions of the signal terminal 4 and the positive power terminal 5 are in the same reference plane, while the fixing portions of other terminals are in another reference plane.

Figure 5:
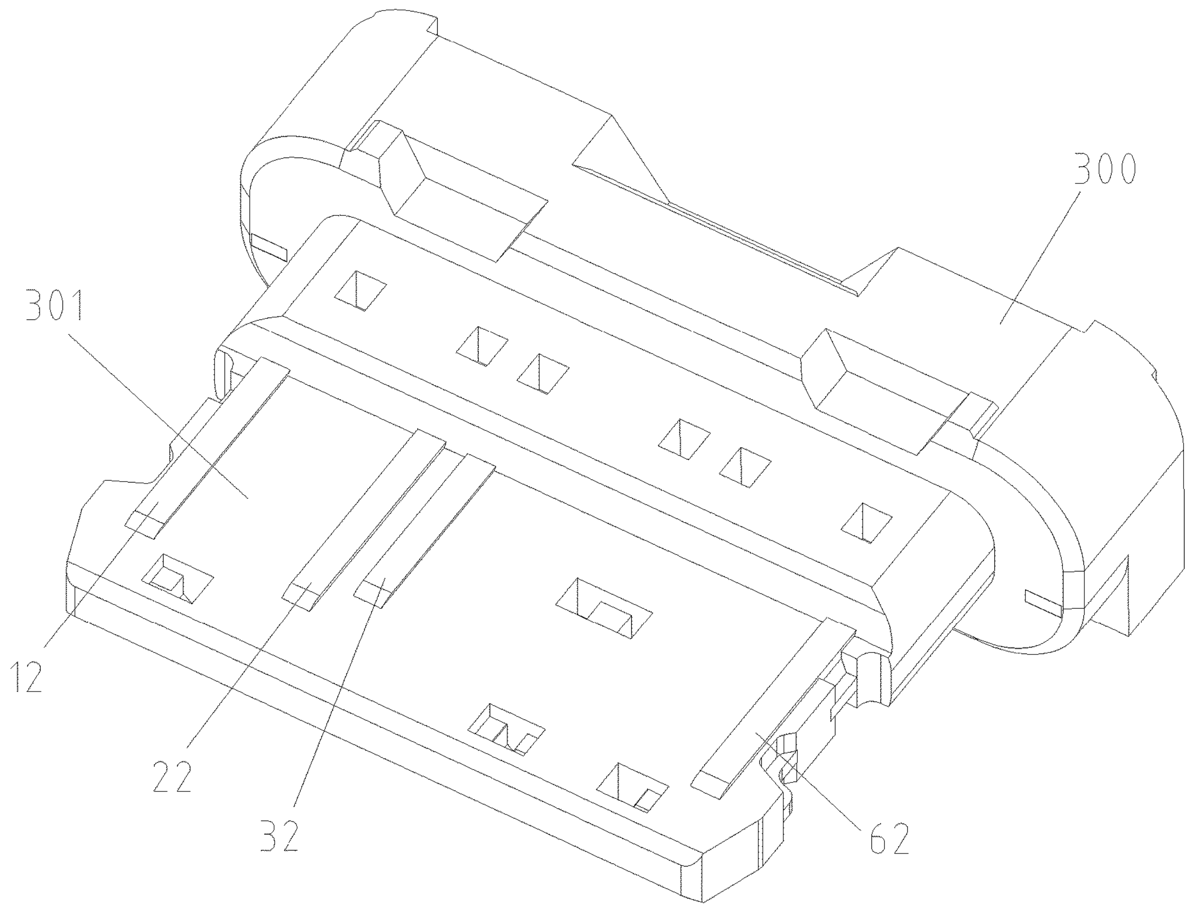
FIG. 5 is a schematic diagram of the insulating body viewed from another angle.

As shown in FIG. 5, in this embodiment, the connecting portion 12 of the ground terminal 1 and the connecting portion 62 of the ground terminal 6 are arranged on an upper side 301 of the insulating body 300. The connecting portions of the two signal terminals and the connecting portions of the two positive power terminals are respectively arranged on the upper side and a lower side of the insulating body 300 in opposite arrangement directions. That is, the connecting portion 22 of the positive power terminal 2 and the connecting portion 32 of the signal terminal 3 are arranged on the upper side 301 of the insulating body 300, and the connecting portion 52 of the positive power terminal 5 and the connecting portion 42 of the signal terminal 4 are arranged on a lower side of the insulating body 300 in an arrangement direction opposite to that of the connecting portions 22 and 32. By setting the connecting portions of the two ground terminals on the same side of the insulating body 300, the configuration of the product is facilitated and thus the configuration and processing of the connecting portion on the lock are facilitated.

The lock includes a securing portion embedded in the insulating body, an engaging portion extending from the securing portion and located in the same reference plane as the securing portion, and a support portion in parallel with the engaging portion. A clamping portion is arranged on the support portion. It is noted that each lock is integrally formed. In an embodiment, the lock 91 includes a securing portion 911 embedded in the insulating body 300, an engaging portion 912 extending from the securing portion 911 and located in the same reference plane as the securing portion 911, and a support portion 915 in parallel with the engaging portion 912. The support portion 915 includes a clamping portion 913. The lock 92 includes a securing portion 921 embedded in the insulating body 300, an engaging portion 922 extending from the securing portion 921 and located in the same reference plane as the securing portion 921, and a support portion 925 in parallel with the engaging portion 922. The support portion 925 includes a clamping portion 923. In this embodiment, the support portion of the lock is formed by tearing the corresponding engaging portion. In detail, the support portion 915 of the lock 91 is formed by tearing the engaging portion 912, and the support portion 925 of the lock 92 is formed by tearing the engaging portion 922. With the support portion arranged on the lock, the rigidity of the lock can be improved, and the stability of the connecting portion of the ground terminal can also be improved. With the engaging portion arranged on the lock, the lock can also be used for electrical transmission. The engaging portions of the two locks are arranged on the same side of the insulating body 300.

In this embodiment, the base plate part 15 of the ground terminal 1 includes a first protrusion 151 abutting the engaging portion 922 of the lock 92. The base plate part 65 of the ground terminal 6 includes a first protrusion 651 abutting the engaging portion 912 of the lock 91. On the one hand, the first protrusion is arranged on the base plate of the ground terminal and abuts the engaging portion of the lock, thus, the lock is electrically in contact with the ground terminal to be used for electrical transmission; on the other hand, the first protrusion can also be used to support the engaging portion of the lock, which stabilizes the size of the product during the injection molding and thus ensures the accuracy of the product.

In this embodiment, the securing portion 911 of the lock 91 includes a second protrusion 9111 abutting the fixing portion 61 of the ground terminal 6, the securing portion 921 of the lock 92 includes a second protrusion 9211 abutting the fixing portion 11 of the ground terminal 1. With the second protrusion, the electrical connection between the lock and the ground terminal can be strengthened, so that the lock can be used as a ground terminal without a welding leg; furthermore, the size of the product can be stabilized during the injection molding to ensure the accuracy of the product.

In this embodiment, the support portion of the lock includes a third protrusion abutting the connecting portion of the ground terminal. For example, the support portion 925 of the lock 92 includes a third protrusion 9251 abutting the connecting portion 12 of the ground terminal 1. With the third protrusion, on the one hand, the electrical connection between the lock and the ground terminal can be strengthened, so that the lock can also be used as a ground terminal without a welding leg; on the other hand, the third protrusion can be used to support the connecting portion of the ground terminal, which stabilizes the size of the product during the injection molding and thus ensures the accuracy of the product.

A first support plate 9121 is arranged on a free end of the engaging portion 912 of the lock 91, and a second support plate 621 is arranged on a free end of the connecting portion 62 of the ground terminal 6. The first support plate 9121 of the lock 91 abuts the second support plate 621 of the ground terminal 6. The second support plate 621 of the ground terminal 6 includes a first step 6211, and the first support plate 9121 of the lock 91 includes a second step 91211. A first support plate 9221 is arranged on a free end of the engaging portion 922 of the lock 92, and a second support plate 121 is arranged on a free end of the connecting portion 12 of the ground terminal 1. The first support plate 9221 of the lock 92 abuts the second support plate 121 of the ground terminal 1. The second support plate 121 of the ground terminal 1 includes a first step 1211, and the first support plate 9221 of the lock 92 includes a second step 92211. Since the first support plate of the lock abuts the second support plate of the ground terminal, the first support plate of the lock and the second support plate of the ground terminal become a reference plane for positioning each other during the injection molding, ensuring the accuracy of the product. With the first step of the ground terminal and the second step of the lock, the thickness of the lock and the thickness of the ground terminal can be reduced, thus, the thickness of the plastic during the injection molding can be increased and the yield of production can be ensured.

A notch is formed in a side of the support portion. In an embodiment, a notch 9152 is formed in the side of the support portion 915 of the lock 91. The side of the support portion 925 of the lock 92 is also provided with a notch. With the notch formed in the side of the support portion of the lock, the fluidity of the plastic around the lock can be improved during the injection molding, and the fluidity of the plastic can be improved when the insulating body encloses the lock.

Figure 6:
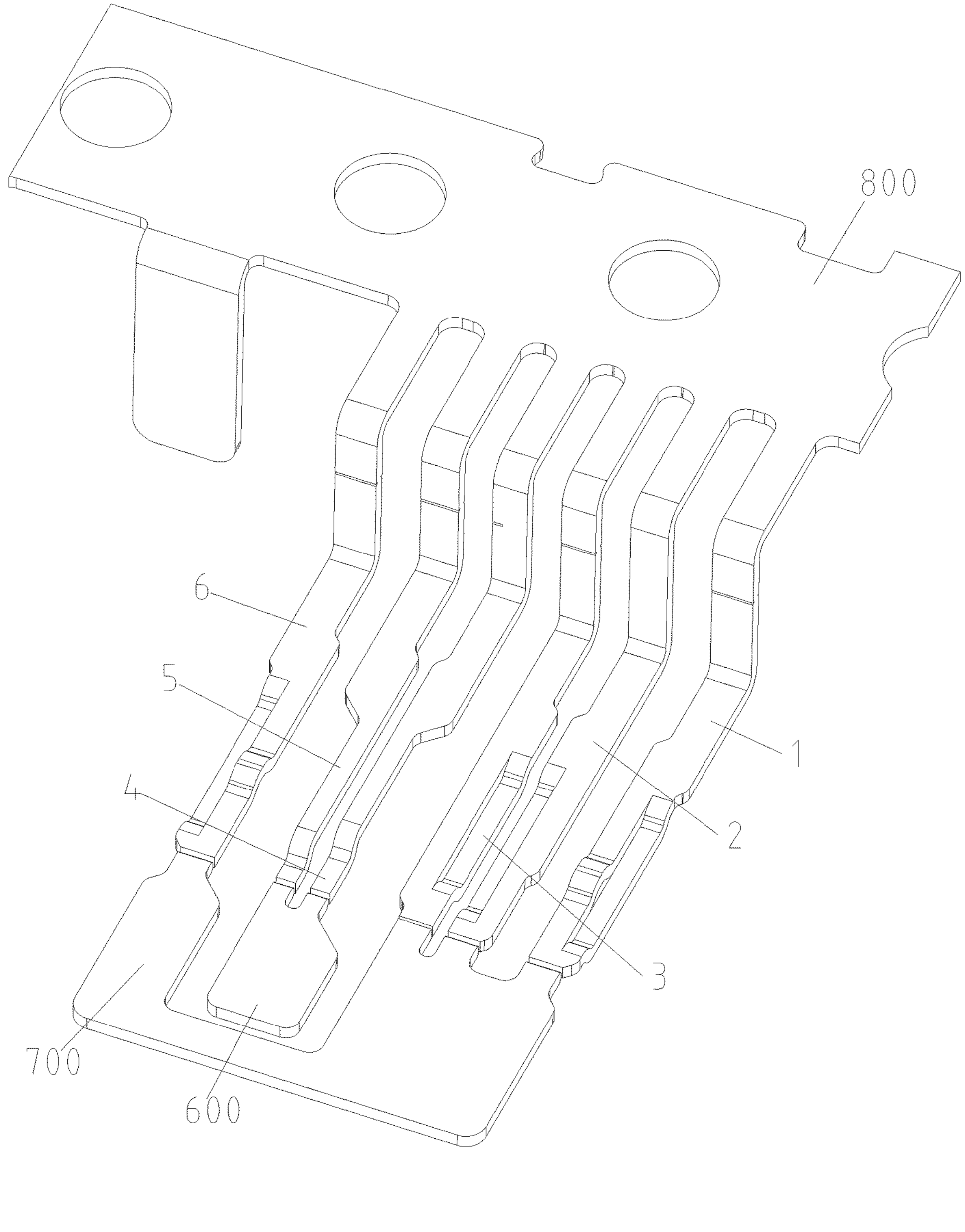
FIG. 6 is a schematic diagram showing the connection between the terminal and a strip.
Figure 7:
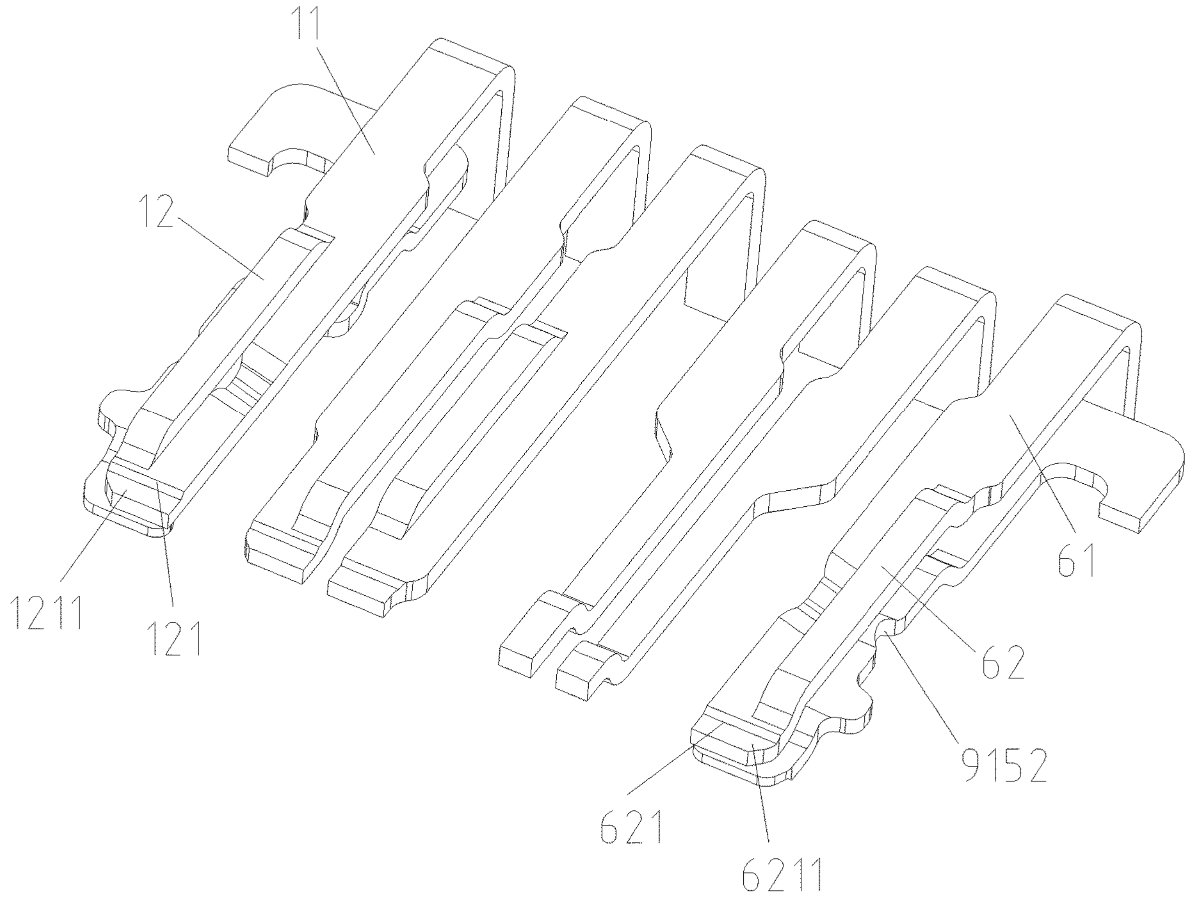
FIG. 7 is a schematic diagram of the terminal and the lock viewed from another angle.

In this embodiment, the securing portion 911 and the engaging portion 912 of the lock 91 are located in the same plane. The securing portion 921 and the engaging portion 922 of the lock 92 are in the same plane. As shown in FIG. 6, all terminals are respectively connected with a rear strip 800 through the welding legs thereof. The free ends of the connecting portions of the positive power terminal 5 and the signal terminal 4 are connected with a first front strip 600; and the free ends of the other terminals are connected with a second front strip 700. The free ends of the connecting portions of the terminals are located in the same reference plane, and the free ends of the welding legs of the terminals are located in the same reference plane, so that the terminals can be processed and formed through the same strip.

Since the connecting portions of some terminals extend from the corresponding fixing portions, the connecting portions and the fixing portions are in the same plane which is the reference plane, thus, the connecting portions of the terminals can be integrally formed without bending the connecting portions relative to the corresponding fixing portions or without tearing the connecting portions. Furthermore, the terminals can be positioned more accurately, which reduces the production difficulty and improves the production efficiency. Meanwhile, compared with the process of tearing the base plate part to form the connecting portion, the connecting portion of the terminal of the present disclosure may not be turned over easily, and thus the production quality is more controllable. Since the engaging portion of the lock extends from the corresponding securing portion, and the engaging portion and the securing portion of the lock are located in the same reference plane, thus, the lock can be integrally formed without bending the engaging portion relative to the corresponding securing portion or without tearing the engaging portion. Furthermore, the lock can be positioned more accurately, which reduces the production difficulty and improves the production efficiency. Meanwhile, the engaging portion of the lock of the present disclosure may not be turned over easily, and thus the production quality is more controllable. The lock is electrically connected with the terminal, and the electrical connection can be realized without arranging the welding leg on the lock. The fixing portions of other terminals are arranged on another reference plane to facilitate the positioning of the other terminals, making the processing of terminals relatively simple.

The connecting portions of the two ground terminals are arranged on the same side of the insulating body, which facilitates the configuration of the product and the arrangement of the lock on the same side to improve the production efficiency, and also facilitates the configuration and processing of the engaging portion of the lock.

The support portion is arranged on the lock to improve the rigidity of the engaging portion of the lock. Moreover, with the engaging portion, the lock can also be used for electrical transmission.

With the first protrusion arranged on the base plate part of the ground terminal abutting the engaging portion of the lock, on the one hand, the lock can be electrically in contact with the ground terminal, such that the lock can be used for electrical transmission; on the other hand, the first protrusion can support the engaging portion of the lock. At the same time, with the first protrusion, the connection between the ground terminal and the insulating body can be more stable.

With the second protrusion arranged on the securing portion of the lock, the electrical connection between the lock and the ground terminal can be strengthened, such that the lock can be used as a ground terminal without a welding leg. At the same time, with the second protrusion, the connection between the lock and the insulating body can be more stable.

With the third protrusion arranged on the support portion of the lock, on the one hand, the electrical connection between the lock and the ground terminal can be strengthened, so that the lock can also be used as a ground terminal without a welding leg; on the other hand, the third protrusion can support the connecting portion of the ground terminal. At the same time, with the third protrusion, the connection between the lock and the insulating body can be more stable.

With the notch formed in the side of the support portion of the lock, the fluidity of the plastic around the lock can be improved during the injection molding, and the fluidity of the plastic can be improved when the insulating body encloses the lock.

Since the first support plate of the lock abuts the second support plate of the ground terminal, the first support plate of the lock and the second support plate of the ground terminal become the reference plane for positioning each other during the injection molding, ensuring the accuracy of the product. With the first and second steps, the thickness of the lock and the thickness of the ground terminal are reduced, such that the thickness of the plastic during the injection molding can be increased and the production yield can be ensured.

Embodiment 2

Figure 8:
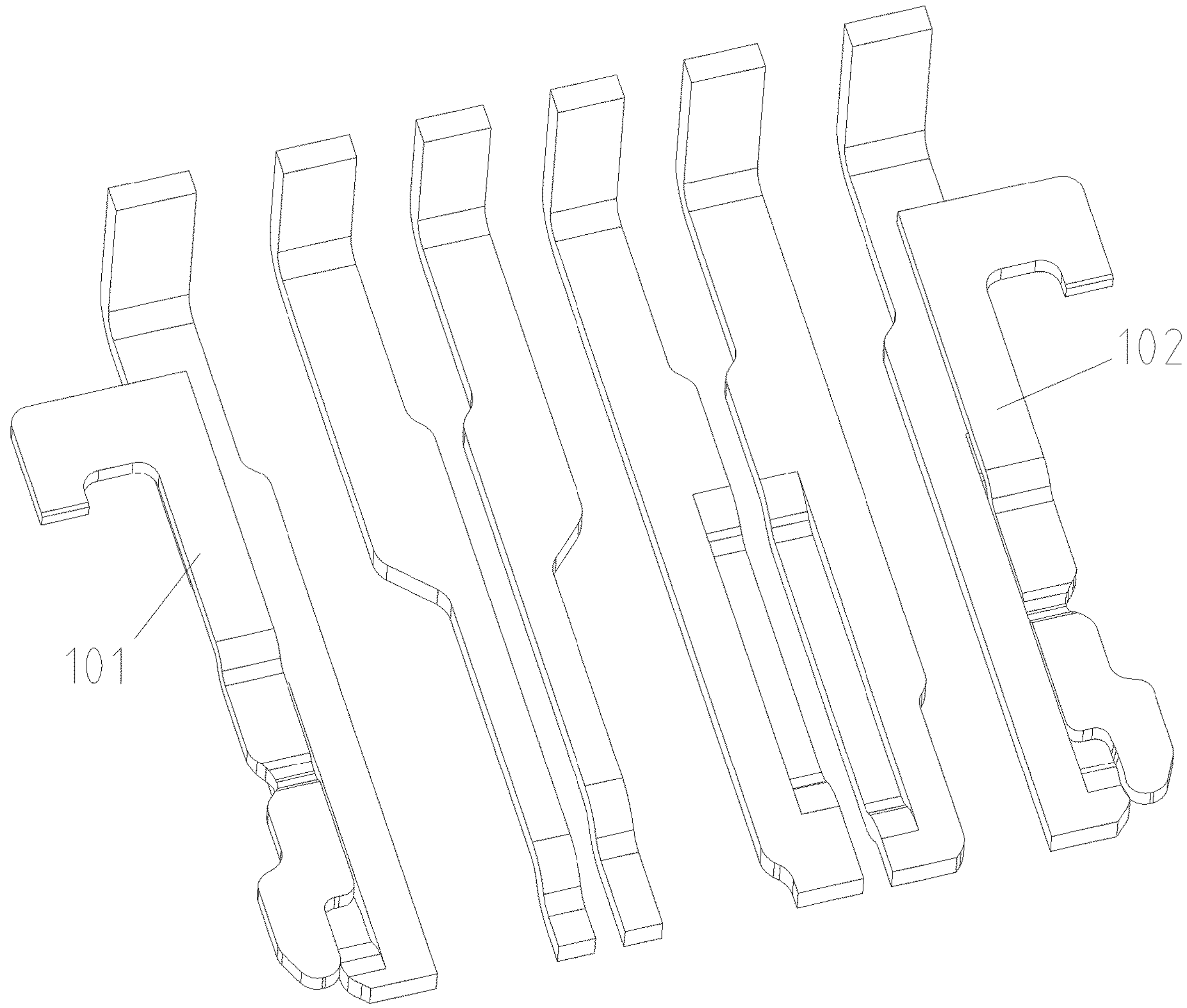
FIG. 8 is a schematic diagram of the lock and each terminal of the type-C female electrical connector in Embodiment 2 of the present disclosure.

As shown in FIG. 8, the difference between the type-C female electrical connector of Embodiment 2 and that of Embodiment 1 lies in that the lock 101 and the lock 102 of Embodiment 2 do not respectively include an engaging portion, and the locks are only used to clamp with the male connector.

The above descriptions are only optional embodiments of the application, and do not limit the scope of the patents of the present application. All the equivalent structural transformations made by the content of the specification and drawings of the present application under the creative concept of the present application, or directly/indirectly used in other related technical fields are all comprised in the protection scope of the patents of the present application.

What is claimed is:

1. A type-C female electrical connector, comprising an insulating body and a number of terminals embedded in the insulating body; wherein each of the terminals comprises a connecting portion, a fixing portion and a welding leg; the connecting portions of some of the terminals extend from the corresponding fixing portions and are located in a same reference plane as the fixing portions, the type-C female electrical connector further comprises an independent lock;

the terminals comprise two ground terminals, two signal terminals and two positive power terminals; the connecting portions of the two ground terminals are arranged on a same side of the insulating body; the connecting portions of the two signal terminals and the connecting portions of the two positive power terminals are respectively arranged on an upper side and a lower side of the insulating body in opposite arrangement directions;

the lock comprises a securing portion embedded in the insulating body, an engaging portion extending from the securing portion and located in a same reference plane as the securing portion, and a support portion in parallel with the engaging portion, and the support portion is provided with a clamping portion.

2. The type-C female electrical connector according to claim 1, wherein the connecting portion of one positive power terminal extends from the corresponding fixing portion and is located in the same reference plane as the corresponding fixing portion; and the connecting portion of one signal terminal extends from the corresponding fixing portion and is located in the same reference plane as the corresponding fixing portion.

3. The type-C female electrical connector according to claim 1, wherein the support portion of the lock is formed by tearing the corresponding engaging portion.

4. The type-C female electrical connector according to claim 1, wherein the ground terminal comprises a base plate part, the base plate part of the ground terminal comprises a first protrusion abutting the engaging portion of the lock.

5. The type-C female electrical connector according to claim 1, wherein the securing portion of the lock comprises a second protrusion abutting the fixing portion of the ground terminal.

6. The type-C female electrical connector according to claim 1, wherein the support portion of the lock comprises a third protrusion abutting the connecting portion of the ground terminal.

7. The type-C female electrical connector according to claim 1, wherein a first support plate is arranged on a free end of the engaging portion of the lock, a second support plate is arranged on a free end of the connecting portion of the ground terminal, the first support plate of the lock abuts the second support plate of the ground terminal, and the second support plate of the ground terminal comprises a thin step.

8. The type-C female electrical connector according to claim 7, wherein the first support plate of the lock comprises a thin step.

9. The type-C female electrical connector according to claim 1, wherein a notch is formed in one side of the support portion of the lock.

10. The type-C female electrical connector according to claim 1, wherein free ends of the connecting portions of the terminals are located in the same reference plane, and free ends of the welding legs of the terminals are located in the same reference plane.

11. The type-C female electrical connector according to claim 1, wherein some of the terminals respectively comprise a base plate part in parallel with the corresponding connecting portions, and the fixing portions of the terminals provided with the base plate parts are located in the same reference plane.

12. The type-C female electrical connector according to claim 1, wherein the type-C female electrical connector comprises two of the independent locks, and the engaging portions of the two locks are arranged on the same side of the insulating body.

* * * * *